United States Patent
Lho et al.

(10) Patent No.: US 12,519,104 B2
(45) Date of Patent: Jan. 6, 2026

(54) METHOD OF PREPARING POSITIVE ELECTRODE ACTIVE MATERIAL FOR SECONDARY BATTERY

(71) Applicant: LG Energy Solution, Ltd., Seoul (KR)

(72) Inventors: Eun Sol Lho, Daejeon (KR); Sang Min Park, Daejeon (KR); Wang Mo Jung, Daejeon (KR); Sung Bin Park, Daejeon (KR); Seul Ki Kim, Daejeon (KR); Wen Xiu Wang, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 552 days.

(21) Appl. No.: 17/627,243

(22) PCT Filed: Aug. 5, 2020

(86) PCT No.: PCT/KR2020/010339
§ 371 (c)(1),
(2) Date: Jan. 14, 2022

(87) PCT Pub. No.: WO2021/025464
PCT Pub. Date: Feb. 11, 2021

(65) Prior Publication Data
US 2022/0246925 A1  Aug. 4, 2022

(30) Foreign Application Priority Data

Aug. 8, 2019  (KR) .................. 10-2019-0096996

(51) Int. Cl.
*H01M 4/525* (2010.01)
*H01M 4/02* (2006.01)
(Continued)

(52) U.S. Cl.
CPC ........... *H01M 4/525* (2013.01); *H01M 4/131* (2013.01); *H01M 4/62* (2013.01); *H01M 2004/028* (2013.01)

(58) Field of Classification Search
CPC ........ H01M 4/525; H01M 4/131; H01M 4/62; H01M 2004/028
See application file for complete search history.

(56) References Cited

U.S. PATENT DOCUMENTS

2002/0114993 A1  8/2002  Miyaki et al.
2004/0179993 A1  9/2004  Dahn et al.
(Continued)

FOREIGN PATENT DOCUMENTS

| CN | 102668188 A | 9/2012 |
| CN | 103746114 A | 4/2014 |

(Continued)

OTHER PUBLICATIONS

Extended European Search Report including Written Opinion for Application No. 20850171.8 dated Jul. 8, 2022, pp. 1-7.
(Continued)

*Primary Examiner* — Brian R Ohara
*Assistant Examiner* — Emily Elizabeth Freeman
(74) *Attorney, Agent, or Firm* — Lerner David LLP

(57) ABSTRACT

A method of preparing a positive electrode active material for a secondary battery, is disclosed herein. In some embodiments, a method includes mixing a positive electrode active material precursor, a lithium source material, a first firing additive, a second firing additive, and a third firing additive a to form a mixture, wherein the positive electrode active material precursor contains nickel, cobalt, and manganese and has a nickel content of 60 mol % or more relative to a total molar amount of metals in the positive electrode active material precursor, and performing primary firing of the mixture to form a lithium transition metal oxide, wherein the first firing additive is a lithium-containing compound, the (Continued)

second firing additive is a carbonate ion-containing compound, and the third firing additive is a boron-containing compound.

7 Claims, 8 Drawing Sheets

(51) Int. Cl.
*H01M 4/131* (2010.01)
*H01M 4/62* (2006.01)

(56) References Cited

U.S. PATENT DOCUMENTS

| | | |
|---|---|---|
| 2009/0230349 A1 | 9/2009 | Dahn et al. |
| 2011/0123865 A1* | 5/2011 | Kepler ................ H01M 4/366 |
| | | 429/223 |
| 2011/0244329 A1* | 10/2011 | Chang ................ C01G 45/1228 |
| | | 977/773 |
| 2012/0231327 A1 | 9/2012 | Hiratsuka |
| 2014/0234718 A1 | 8/2014 | Lee et al. |
| 2015/0030927 A1 | 1/2015 | Kwak et al. |
| 2015/0030928 A1 | 1/2015 | Kwak et al. |
| 2015/0037678 A1 | 2/2015 | Kwak et al. |
| 2015/0357627 A1 | 12/2015 | Kwak et al. |
| 2017/0288221 A1* | 10/2017 | Kobayashi ............ H01M 4/131 |
| 2017/0317349 A1* | 11/2017 | Ju ......................... C01G 53/50 |
| 2018/0261842 A1 | 9/2018 | Park et al. |
| 2018/0294477 A1 | 10/2018 | Shin et al. |
| 2018/0366773 A1 | 12/2018 | Endo et al. |
| 2019/0288284 A1 | 9/2019 | Otterstedt |
| 2019/0372115 A1 | 12/2019 | Shin et al. |
| 2020/0119350 A1* | 4/2020 | Nakayama ............ H01M 4/505 |
| 2021/0313573 A1 | 10/2021 | Park et al. |

FOREIGN PATENT DOCUMENTS

| | | |
|---|---|---|
| CN | 104485452 A | 4/2015 |
| CN | 107039650 A | 8/2017 |
| CN | 108557905 A | 9/2018 |
| CN | 108598457 A | 9/2018 |
| CN | 109148879 A | 1/2019 |
| CN | 109437339 A | 3/2019 |
| EP | 0836238 A1 | 4/1998 |
| JP | 2007335169 A | 12/2007 |
| JP | 2008186753 A | 8/2008 |
| JP | 2010177024 A | 8/2010 |
| JP | 2015503181 A | 1/2015 |
| JP | 2018104688 A | 7/2018 |
| JP | 2018532236 A | 11/2018 |
| JP | 2018533157 A | 11/2018 |
| KR | 20050111764 A | 11/2005 |
| KR | 20100042145 A | 4/2010 |
| KR | 20130012007 A | 1/2013 |
| KR | 20150013076 A | 2/2015 |
| KR | 20170063408 A | 6/2017 |
| KR | 20180077090 A | 7/2018 |
| WO | 2017104688 A1 | 6/2017 |
| WO | WO-2017095133 A1 * | 6/2017 ........... C01G 37/006 |
| WO | 2018016525 A1 | 1/2018 |

OTHER PUBLICATIONS

Park, K. et al., "Improved Cycling Stability of Li[Ni 0.90 Co 0.05 Mn 0.05 ] O2 Through Microstructure Modification by Boron Doping for Li-Ion Batteries", Advanced Energy Materials, Jul. 11, 2018, pp. 1801202 (1-9), vol. 8, No. 25. XP055791596.

Search Report dated Aug. 8, 23 from the Office Action for Chinese Application No. 202080052860.3 issued Aug. 23, 2023, pp. 1-3. [See pp. 1-2, categorizing the cited references].

International Search Report for Application No. PCT/KR2020/010339 dated Nov. 11, 2020, pp. 1-3.

Search Report dated Mar. 13, 2024 from the Office Action for Chinese Application No. 202080052860.3 issued Mar. 29, 2024, pp. 1-3.

* cited by examiner

[FIG. 1]
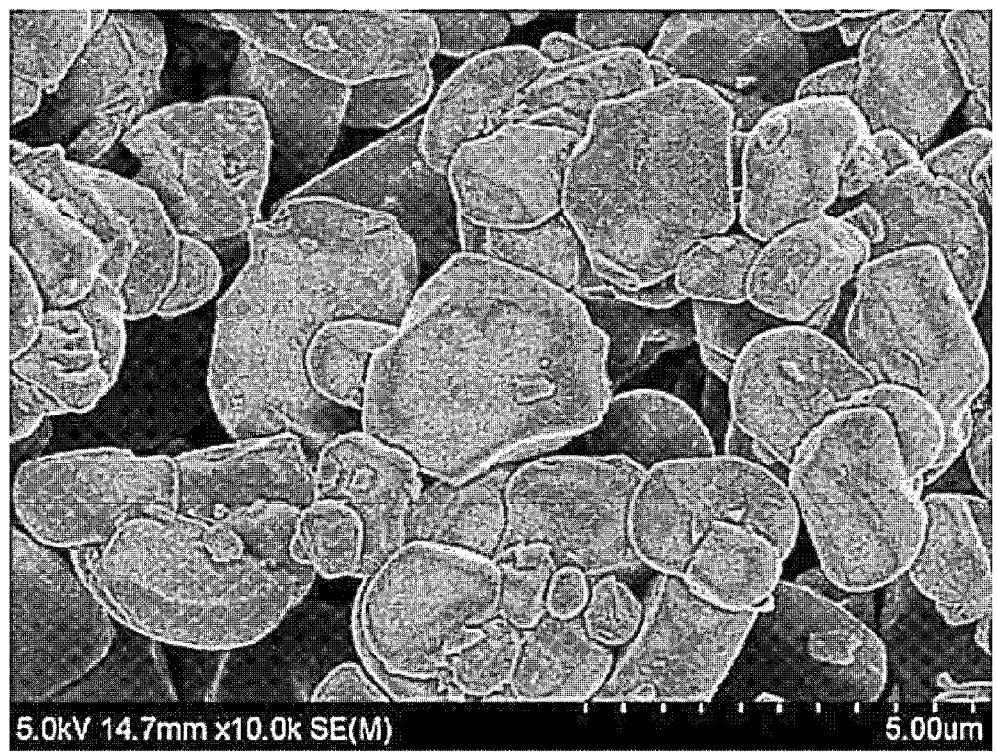

[FIG. 2]
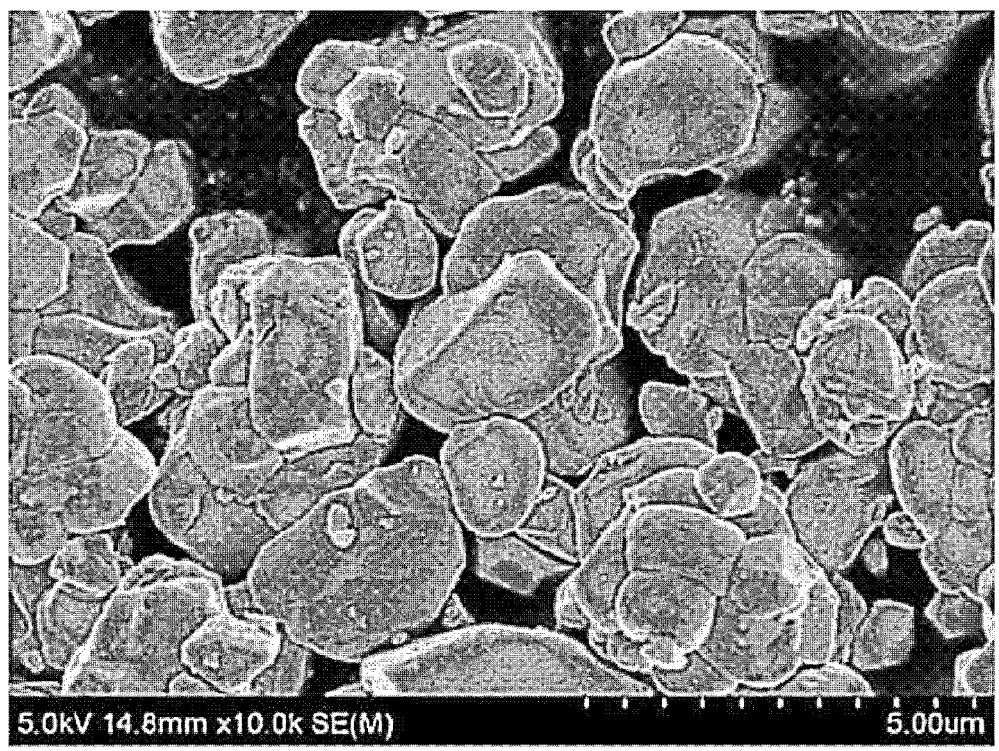

[FIG. 3]
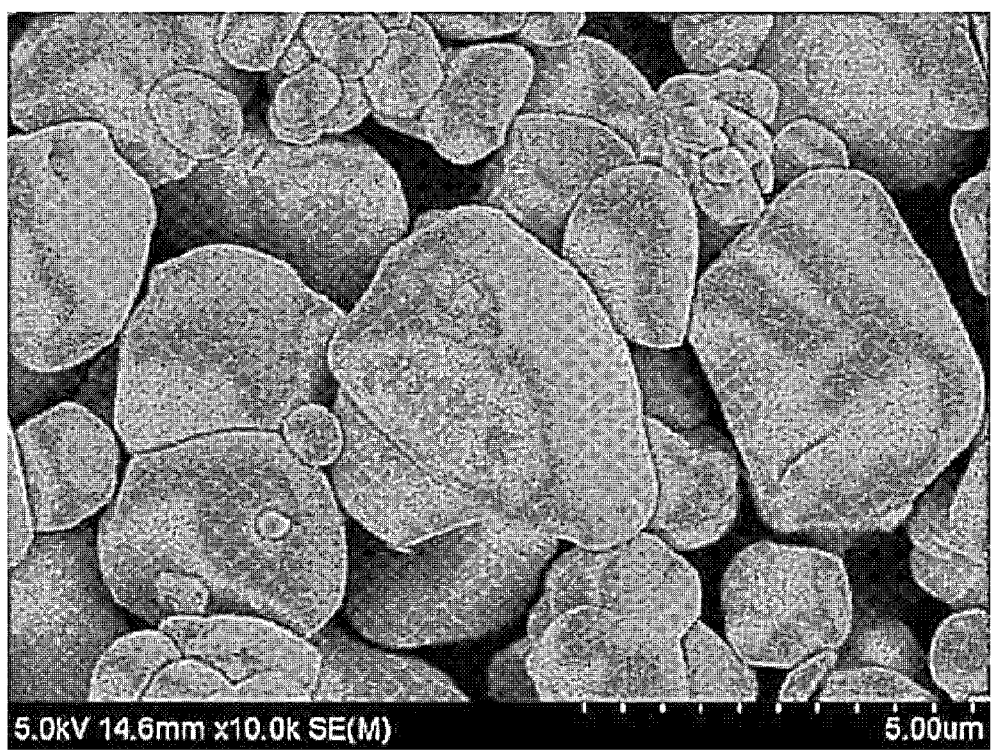

[FIG. 4]
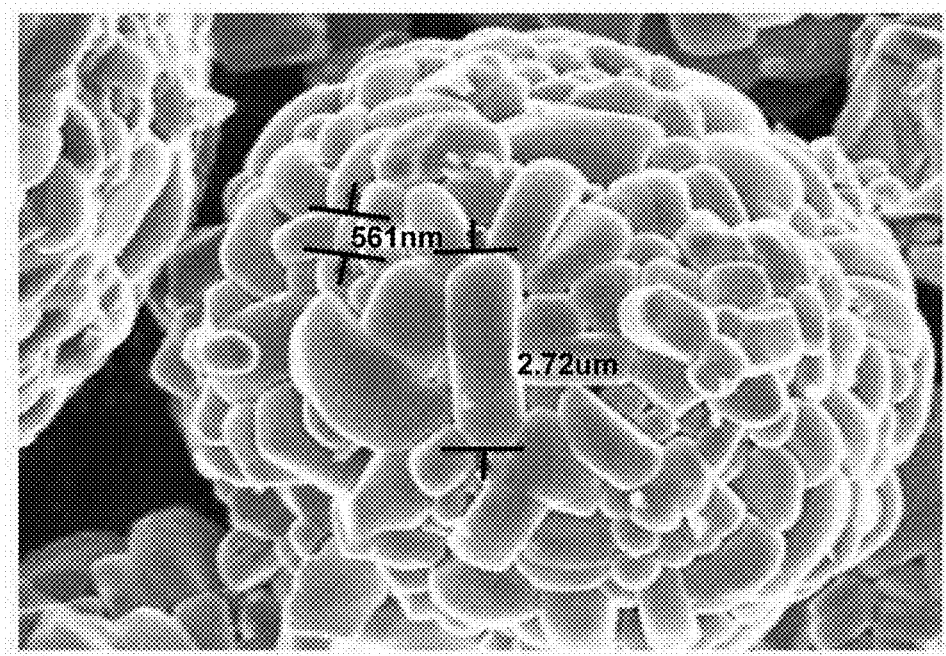

[FIG. 5]
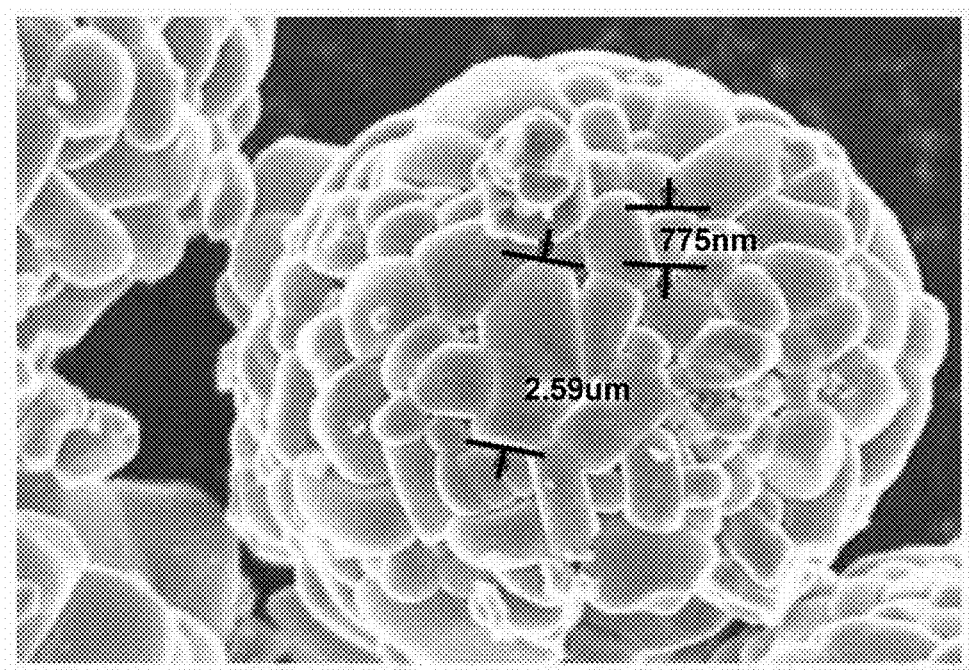

[FIG. 6]
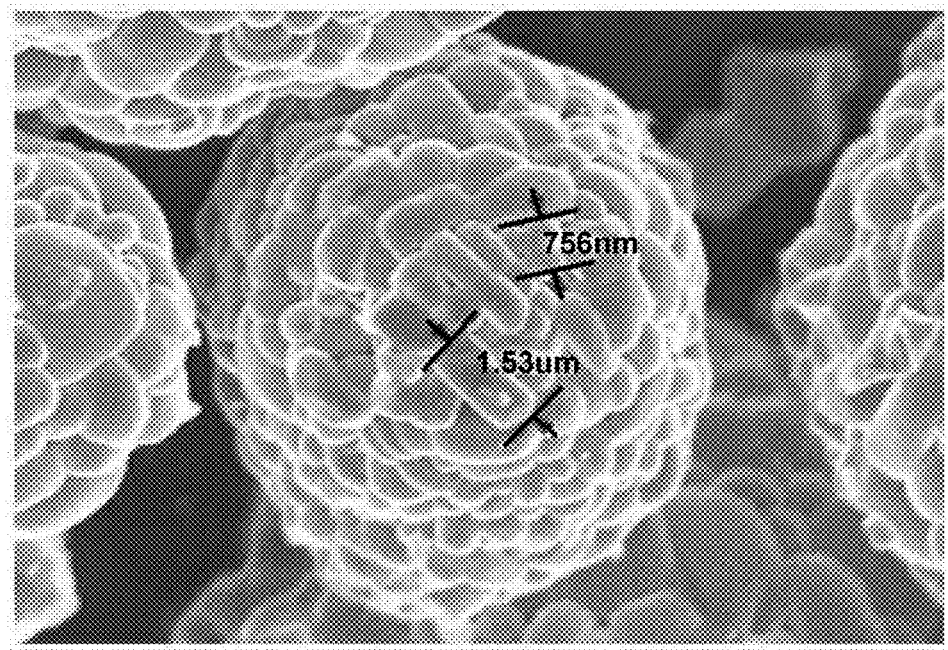

[FIG. 7]
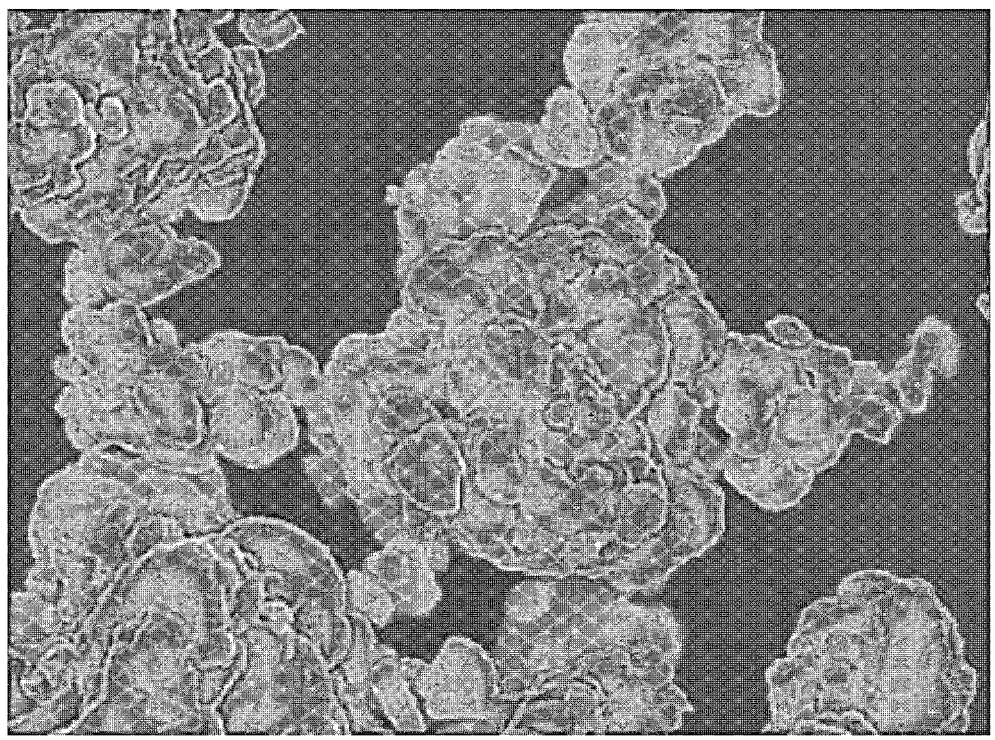

[FIG. 8]
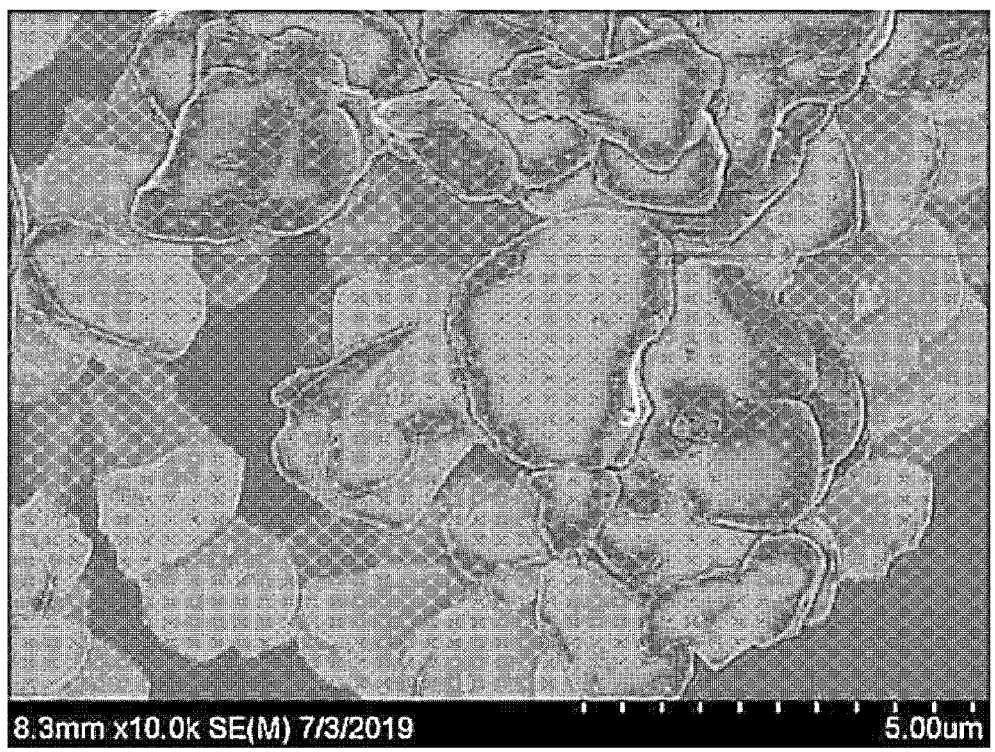

METHOD OF PREPARING POSITIVE ELECTRODE ACTIVE MATERIAL FOR SECONDARY BATTERY

CROSS-REFERENCE TO RELATED APPLICATION

This application is a national phase entry under 35 U.S.C. § 371 of International Application No. PCT/KR2020/010339, filed on Aug. 5, 2020, which claims priority from Korean Patent Application No. 10-2019-0096996, filed on Aug. 8, 2019, the disclosures of which are incorporated by reference herein.

TECHNICAL FIELD

The present invention relates to a method of preparing a positive electrode active material for a secondary battery.

BACKGROUND ART

Recently, in response to the rapid spread of electronic devices using batteries, such as mobile phones, notebook computers, electric vehicles, and the like, demand for secondary batteries having a small size, a light weight, and relatively high capacity is rapidly increasing. In particular, lithium secondary batteries have been in the spotlight as a driving power source for portable devices due to having a light weight and high energy density. Accordingly, research and development efforts for improving the performance of lithium secondary batteries have been continuously made.

Lithium secondary batteries generate electrical energy through oxidation and reduction reactions when lithium ions are intercalated/deintercalated into/from a positive electrode and a negative electrode while an organic electrolyte solution or a polymer electrolyte solution fills an empty space between a positive electrode and a negative electrode which consist of active materials enabling the intercalation and deintercalation of lithium ions.

As positive electrode active materials for lithium secondary batteries, lithium-cobalt oxides ($LiCoO_2$), lithium-nickel oxides ($LiNiO_2$), lithium-manganese oxides ($LiMnO_2$, $LiMn_2O_4$, etc.), lithium-iron phosphate oxides ($LiFePO_4$), and the like have been used. Among them, lithium-cobalt oxides ($LiCoO_2$) have been widely used due to having a high operating voltage and excellent capacity characteristics and applied as positive electrode active materials for high-voltage operation. However, $LiCoO_2$ has a limitation in mass use as a power source in the electric vehicle field and the like due to an increase in price of cobalt (Co) and unstable supply thereof, and therefore, a need to develop positive electrode active materials that can replace $LiCoO_2$ has been raised.

Accordingly, nickel-cobalt-manganese-based lithium composite transition metal oxides (hereinafter, simply referred to as "NCM-based lithium composite transition metal oxides"), in which a part of the cobalt (Co) is substituted with nickel (Ni) and manganese (Mn), have been developed. Recently, a study has been conducted to increase capacity by increasing a Ni content in the NCM-based lithium composite transition metal oxides. However, nickel (Ni)-rich positive electrode active materials having a high nickel content cause problems such as a degradation of thermal stability, an increase in resistance caused by increased side reactions during an electrochemical reaction, and an increase in gas generation.

To compensate for the problems, studies on doping, coating, and surface structure modification have been conducted, but there is a limitation in improvement with these techniques. Accordingly, attempts have been made to improve problems, such as a degradation of thermal stability and an increase in side reactions and resistance, by minimizing an interface of secondary particles by performing over-firing while increasing a firing temperature in the preparation of the nickel (Ni)-rich positive electrode active material. However, when the degree of over-firing is not properly adjusted due to a difficulty in controlling the over-firing performed while increasing a firing temperature, there is a problem of performance deterioration such as a degradation of charge/discharge efficiency, an increase in resistance, and the like.

DISCLOSURE

Technical Problem

The present invention is directed to providing a method of preparing a positive electrode active material, a nickel (Ni)-rich NCM-based lithium composite transition metal oxide, in the form of a single particle by performing over-firing at a relatively low firing temperature rather than while increasing a firing temperature.

Technical Solution

One aspect of the present invention provides a method of preparing a positive electrode active material for a secondary battery, which includes mixing a positive electrode active material precursor, a lithium source material, a first firing additive, a second firing additive, and a third firing additive to form a mixture, wherein the positive electrode active material precursor contains nickel, cobalt, and manganese and has a nickel content of 60 mol % or more relative to a total molar amount of metals in the positive electrode active material precursor, and performing primary firing of the mixture to form a lithium transition metal oxide, wherein the first firing additive is a lithium-containing compound, the second firing additive is a carbonate ion-containing compound, and the third firing additive is a boron-containing compound.

Advantageous Effects

According to the present invention, a positive electrode active material, a nickel (Ni)-rich NCM-based lithium composite transition metal oxide, can be prepared in the form of a single particle by performing over-firing at a relatively low firing temperature rather than while increasing a firing temperature as in conventional cases. According to the present invention, since the over-firing is easily controlled, and an interface of secondary particles in the prepared positive electrode active material is minimized, thermal stability can be enhanced, the occurrence of side reactions can be improved, and performance deterioration such as a degradation of charge/discharge efficiency, an increase in resistance, and the like can be minimized.

DESCRIPTION OF DRAWINGS

FIG. 1 is an enlarged scanning electron microscope (SEM) image of a positive electrode active material prepared according to Example 1.

FIG. 2 is an enlarged SEM image of a positive electrode active material prepared according to Example 2.

FIG. 3 is an enlarged SEM image of a positive electrode active material prepared according to Example 3.

FIG. 4 is an enlarged SEM image of a positive electrode active material prepared according to Comparative Example 1.

FIG. 5 is an enlarged SEM image of a positive electrode active material prepared according to Comparative Example 2.

FIG. 6 is an enlarged SEM image of a positive electrode active material prepared according to Comparative Example 3.

FIG. 7 is an enlarged SEM image of a positive electrode active material prepared according to Comparative Example 4.

FIG. 8 is an enlarged SEM image of a positive electrode active material prepared according to Comparative Example 5.

MODES OF THE INVENTION

Hereinafter, the present invention will be described in more detail to facilitate understanding of the present invention. Terms and words used in this specification and the claims should not be interpreted as limited to commonly used meanings or meanings in dictionaries and should be interpreted with meanings and concepts which are consistent with the technological scope of the present invention based on the principle that the inventors can appropriately define concepts of terms in order to describe the invention in the best way.

<Method of Preparing Positive Electrode Active Material>

The present invention provides a method of preparing a positive electrode active material, which includes: mixing a positive electrode active material precursor, a lithium source material, a first firing additive, a second firing additive, and a third firing additive to form a mixture, wherein the positive electrode active material precursor contains nickel, cobalt, and manganese and has a nickel content of 60 mol % or more relative to a total molar amount of metals in the positive electrode active material precursor, and performing primary firing of the mixture to form a lithium transition metal oxide, wherein the first firing additive is a lithium-containing compound, the second firing additive is a carbonate ion-containing compound, and the third firing additive is a boron-containing compound.

It is more difficult to prepare a nickel (Ni)-rich NCM-based lithium composite transition metal oxide having a high Ni content in the form of a single particle than a low-concentration-Ni NCM-based lithium composite transition metal oxide having a relatively low Ni content. This is because the particle growth of high-concentration Ni is more difficult than that of low-concentration Ni, and although there is a method of performing over-firing while more extremely increasing a firing temperature, this way allows an increase in occurrence of Ni cation mixing in a lithium (Li) layer and the formation of an excessive amount of a spinel or rock salt structure in a surface of a single particle, causing performance deterioration such as an increase in resistance, a decrease in efficiency, and the like to be worsened.

However, in the present invention, since a specific combination of firing additives is used, it is possible to prepare a Ni-rich NCM-based lithium composite transition metal oxide in the form of a single particle by performing over-firing at a relatively low firing temperature without increasing a firing temperature. In addition, according to the preparation method of the present invention, since over-firing is easily controlled, and an interface of secondary particles in the prepared positive electrode active material is minimized, it is possible to enhance thermal stability, improve the occurrence of side reactions, and minimize performance deterioration such as a degradation of charge/discharge efficiency, an increase in resistance, and the like.

The method of preparing a positive electrode active material will be described in detail for each step.

First, a positive electrode active material precursor, which contains nickel (Ni), cobalt (Co), and manganese (Mn) and has a Ni content of 60 mol % or more relative to a total molar amount of metals in the positive electrode active material precursor, is provided.

The positive electrode active material precursor may be a Ni-rich compound having a Ni content 60 mol % or more relative to a total molar amount of metals, preferably a Ni content of 70 mol % or more, and more preferably a Ni content of 80 mol % or more. When a Ni content of 60 mol % or more as described above, high capacity can be ensured.

The positive electrode active material precursor may be represented by the following Chemical Formula 1.

   [Chemical Formula 1]

In Chemical Formula 1, M is one or more metal elements selected from the group consisting of Al, Mg, V, Ti, Zr, W, Sn, and Nb, $0.6 \leq a < 1$, $a+b+c+d=1$, $0 < b \leq 0.4$, $0 < c \leq 0.3$, and $0 \leq d \leq 0.05$.

As the positive electrode active material precursor, a commercially available positive electrode active material precursor may be purchased and used, or the positive electrode active material precursor may be prepared by a method of preparing a positive electrode active material precursor well known in the art.

For example, the nickel-cobalt-manganese precursor may be prepared by subjecting a transition metal solution containing a nickel-containing raw material, a cobalt-containing raw material, and a manganese-containing raw material to a co-precipitation reaction by adding an ammonium cation-containing complex-forming agent and a basic compound thereto.

The nickel-containing raw material may, for example, be a nickel-containing acetate, nitrate, sulfate, halide, sulfide, hydroxide, oxide, or oxyhydroxide and may specifically be $Ni(OH)_2$, NiO, NiOOH, $NiCO_3 \cdot 2Ni(OH)_2 \cdot 4H_2O$, $NiC_2O_2 \cdot 2H_2O$, $Ni(NO_3)_2 \cdot 6H_2O$, $NiSO_4$, $NiSO_4 \cdot 6H_2O$, nickel fatty acid salts, nickel halides, or a combination thereof, but the present invention is not limited thereto.

The cobalt-containing raw material may be a cobalt-containing acetate, nitrate, sulfate, halide, sulfide, hydroxide, oxide, or oxyhydroxide and may specifically be $Co(OH)_2$, CoOOH, $Co(OCOCH_3)_2 \cdot 4H_2O$, $Co(NO_3)_2 \cdot 6H_2O$, $CoSO_4$, $Co(SO_4)_2 \cdot 7H_2O$, or a combination thereof, but the present invention is not limited thereto.

The manganese-containing raw material may, for example, be a manganese-containing acetate, nitrate, sulfate, halide, sulfide, hydroxide, oxide, oxyhydroxide, or a combination thereof and may specifically be a manganese oxide such as $Mn_2O_3$, $MnO_2$, $Mn_3O_4$, or the like, a manganese salt such as $MnCO_3$, $Mn(NO_3)_2$, $MnSO_4$, a manganese acetate, manganese dicarboxylate salts, manganese citrate, or a manganese fatty acid salt, manganese oxyhydroxide, manganese chloride, or a combination thereof, but the present invention is not limited thereto.

The transition metal solution may be prepared by adding a nickel-containing raw material, a cobalt-containing raw material, and a manganese-containing raw material to a solvent, specifically, water, or a solvent mixture of water and an organic solvent (e.g., alcohol, etc.) uniformly mixable with water or by mixing a nickel-containing raw material aqueous solution, a cobalt-containing raw material aqueous solution, and a manganese-containing raw material aqueous solution.

The ammonium cation-containing complex-forming agent may, for example, be $NH_4OH$, $(NH_4)_2SO_4$, $NH_4NO_3$, $NH_4Cl$, $CH_3COONH_4$, $NH_4CO_3$, or a combination thereof, but the present invention is not limited thereto. Meanwhile, the ammonium cation-containing complex-forming agent may be used in the form of an aqueous solution, and, in this case, water or a mixture of water and an organic solvent (specifically, alcohol, etc.) uniformly mixable with water may be used as a solvent.

The basic compound may be a hydroxide of an alkali metal or alkaline earth metal, such as NaOH, KOH, $Ca(OH)_2$, or the like, a hydrate thereof, or a combination thereof. The basic compound may also be used in the form of an aqueous solution, and, in this case, water or a mixture of water and an organic solvent (specifically, alcohol, etc.) uniformly mixable with water may be used as a solvent.

The basic compound is added to adjust the pH of a reaction solution and may be added so that the pH of a metal solution ranges from 11 to 13.

Meanwhile, the co-precipitation reaction may be performed at 40° C. to 70° C. under an inert atmosphere such as a nitrogen or argon atmosphere.

By the above-described process, nickel-cobalt-manganese hydroxide particles are produced and precipitated in a reaction solution. The precipitated nickel-cobalt-manganese hydroxide particles may be separated by a conventional method and dried to obtain a nickel-cobalt-manganese precursor.

Next, a lithium transition metal oxide is formed by mixing the positive electrode active material precursor, a lithium source material, a first firing additive, a second firing additive, and a third firing additive and performing primary firing.

The lithium source material may be a lithium-containing sulfate, nitrate, acetate, carbonate, oxalate, citrate, halide, hydroxide, or oxyhydroxide and is not particularly limited as long as it can be dissolved in water. Specifically, the lithium source material may be $Li_2CO_3$, $LiNO_3$, $LiNO_2$, $LiOH$, $LiOH \cdot H_2O$, $LiH$, $LiF$, $LiCl$, $LiBr$, $LiI$, $CH_3COOLi$, $Li_2O$, $Li_2SO_4$, $CH_3COOLi$, $Li_3C_6H_5O_7$, or the like, which may be used alone or in combination of two or more thereof.

The positive electrode active material precursor and the lithium source material may be mixed so that a molar ratio (Li/Me) of lithium (Li) of the lithium source material and the metal (Me) of the positive electrode active material precursor is 1.0 to 1.3, and more preferably, 1.05 to 1.15.

The first firing additive is a lithium-containing compound. Specifically, the first firing additive may be at least one selected from the group consisting of LiOH, $Li_2CO_3$, $Li_2O$, and LiF and more preferably is LiOH or LiF.

The second firing additive is a carbonate ion-containing compound. Specifically, the second firing additive may be at least one selected from the group consisting of $BaCO_3$, $NaCO_3$, $MgCO_3$, and $CaCO_3$ and more preferably is $MgCO_3$ or $CaCO_3$.

The third firing additive is a boron-containing compound. Specifically, the third firing additive may be at least one selected from the group consisting of $B_2O_3$ and $H_3BO_3$ and more preferably is $B_2O_3$.

The first firing additive, the second firing additive, and the third firing additive may be included in an amount of 30 to 60 parts by weight, 10 to 40 parts by weight, and 10 to 40 parts by weight, respectively, with respect to a total content (100 parts by weight) of the first, second, and third firing additives. More preferably, the first firing additive, the second firing additive, and the third firing additive are included in an amount of 40 to 60 parts by weight, 10 to 30 parts by weight, and 20 to 40 parts by weight, respectively.

The total content of the first, second, and third firing additives may be in a range of 0.5 to 15 parts by weight, preferably 1 to 10 parts by weight, and more preferably 3 to 8 parts by weight with respect to 100 parts by weight of the positive electrode active material precursor.

When the total content and content ratio of the first, second, and third firing additives satisfy the above-described ranges, a Ni-rich NCM-based lithium composite transition metal oxide can be prepared in the form of a single particle even at a relatively low temperature by effectively lowering an over-firing temperature.

A temperature for the primary firing may be 650° C. to 850° C., preferably 680° C. to 830° C., and more preferably 700° C. to 800° C. In the present invention, since a specific combination of firing additives, which is capable of lowering an over-firing temperature, is used, a Ni-rich NCM-based lithium composite transition metal oxide may be prepared in the form of a single particle at a relatively low firing temperature.

The firing may be performed under an air or oxygen ($O_2$) atmosphere.

As a result, the lithium transition metal oxide may be formed in the form of a single particle. Preferably, the lithium transition metal oxide is in the form of a single particle having an average particle diameter ($D_{50}$) of 1 to 8 µm, more preferably 2 to 6 µm, and even more preferably 3 to 5 µm.

In the present invention, an average particle diameter ($D_{50}$) may be defined as a particle diameter corresponding to 50% of the cumulative volume in a particle diameter distribution curve. The average particle diameter ($D_{50}$) may be measured using, for example, a laser diffraction method. For example, the average particle diameter ($D_{50}$) of the positive electrode active material may be measured by dispersing positive electrode active material particles in a dispersion medium, inputting the dispersion into a commercially available laser diffraction particle size analyzer (e.g., Microtrac MT 3000), irradiating the same with ultrasonic waves at a frequency of about 28 kHz and an output of 40 W, and then calculating an average particle diameter ($D_{50}$) corresponding to 50% of the cumulative volume in the analyzer.

When the lithium composite transition metal oxide satisfies the form of a single particle consisting of a primary particle, thermal stability may be enhanced, and the occurrence of side reactions may be improved. In the present invention, a "primary particle" means a primary structure in the form of a single particle, and a "secondary particle" means a secondary structure, that is, an agglomerate formed by agglomerating primary particles due to a physical or chemical bond between primary particles without a process of intentionally agglomerating or assembling primary particles constituting a secondary particle.

Next, after the primary firing, a step of pulverizing and rinsing the lithium transition metal oxide and then performing secondary firing at 600° C. to 750° C. may be further included.

The pulverization and rinsing step are not particularly limited and may be performed by a method well known in the art within the range not deteriorating performance.

Specifically, the rinsing step may be performed, for example, by inputting the lithium composite transition metal oxide into a rinsing liquid such as distilled water or tap water and performing stirring. In this case, a temperature of the rinsing liquid used in the rinsing step may be 1° C. to 80° C., and preferably, 5° C. to 50° C., and a rinsing time may be 3 minutes to 60 minutes, and preferably, 5 minutes to 40 minutes. When the rinsing temperature and time satisfy the above-described ranges, lithium by-products can be effectively removed.

The rinsing step may be performed by mixing the rinsing liquid and the lithium composite transition metal oxide at 100:20 to 100:300 parts by weight, preferably 100:50 to 100:200 parts by weight, and more preferably 100:60 to 100:180 parts by weight. When the mixing ratio of the rinsing liquid and the lithium composite transition metal oxide satisfies the above-described range, it is possible to reduce the surface defects of the lithium composite transition metal oxide while effectively removing lithium by-products.

The secondary firing may be performed to improve the surface defects caused by the rinsing and performed at 600° C. to 750° C., and preferably, 650° C. to 750° C. Surface treatment through the secondary firing is effective for controlling the reactivity of the surface of the positive electrode active material and enhancing ion conductivity.

<Positive Electrode and Lithium Secondary Battery>

Another aspect of the present invention provides a positive electrode for a secondary battery and a lithium secondary battery, which include the above-described positive electrode active material.

Specifically, the positive electrode includes a positive electrode current collector and a positive electrode active material layer formed on the positive electrode current collector and including the above-described positive electrode active material.

In the positive electrode, the positive electrode current collector is not particularly limited as long as it does not cause a chemical change in the battery and has conductivity. For example, stainless steel, aluminum, nickel, titanium, calcined carbon, aluminum or stainless steel whose surface has been treated with carbon, nickel, titanium, silver, or the like, or the like may be used as the positive electrode current collector. In addition, the positive electrode current collector may typically have a thickness of 3 μm to 500 μm and have fine irregularities formed on the surface thereof to increase the adhesion of the positive electrode active material. Additionally, the positive electrode current collector may be used in any of various forms such as a film, a sheet, a foil, a net, a porous material, a foam, a non-woven fabric, and the like.

The positive electrode active material layer may include a conductive material and a binder in addition to the above-described positive electrode active material.

The conductive material is used to impart conductivity to the electrode, and any conductive material that does not cause a chemical change in the battery and has electron conductivity may be used without particular limitation. Specific examples of the conductive material include: graphite such as natural graphite, artificial graphite, or the like; a carbon-based material such as carbon black, acetylene black, Ketjen black, channel black, furnace black, lamp black, thermal black, carbon fiber, or the like; a metal powder or metal fiber containing copper, nickel, aluminum, silver, or the like; a conductive whisker such as zinc oxide, potassium titanate, or the like; a conductive metal oxide such as titanium oxide or the like; and a conductive polymer such as a polyphenylene derivative or the like, which may be used alone or in combination of two or more thereof. The conductive material may be included at 1 to 30 wt % with respect to the total weight of the positive electrode active material layer.

The binder serves to improve cohesion between positive electrode active material particles and adhesion between the positive electrode active material and the positive electrode current collector. Specific examples of the binder include polyvinylidene fluoride (PVDF), a vinylidene fluoride-hexafluoropropylene copolymer (PVDF-co-HFP), polyvinyl alcohol, polyacrylonitrile, carboxymethylcellulose (CMC), starch, hydroxypropylcellulose, regenerated cellulose, polyvinylpyrrolidone, polytetrafluoroethylene, polyethylene, polypropylene, ethylene-propylene-diene monomer rubber (EPDM rubber), a sulfonated EPDM, styrene butadiene rubber (SBR), fluorine rubber, and various copolymers thereof, which may be used alone or in combination of two or more thereof. The binder may be included at 1 to 30 wt % with respect to the total weight of the positive electrode active material layer.

The positive electrode may be manufactured by a conventional method of manufacturing a positive electrode, except that the above-described positive electrode active material is used. Specifically, the positive electrode may be manufactured by applying a composition for forming a positive electrode active material layer, which includes the above-described positive electrode active material and, optionally, a binder and a conductive material, onto a positive electrode current collector, followed by drying and roll pressing. In this case, the types and contents of the positive electrode active material, the binder, and the conductive material have been described above.

A solvent may be a solvent generally used in the art, and examples of the solvent include dimethyl sulfoxide (DMSO), isopropyl alcohol, N-methyl pyrrolidone (NMP), acetone, water, and the like, which may be used alone or in combination of two or more thereof. The solvent is used in an amount just enough to dissolve or disperse the positive electrode active material, the conductive material, and the binder and to have a viscosity capable of achieving excellent thickness uniformity upon subsequent application for manufacturing the positive electrode in consideration of a thickness of an applied slurry and a manufacturing yield.

According to another method, the positive electrode may be manufactured by laminating, on a positive electrode current collector, a film obtained by casting the composition for forming a positive electrode active material layer on a separate support and removing it from the support.

Still another aspect of the present invention provides an electrochemical device including the above-described positive electrode. The electrochemical device may specifically be a battery, a capacitor, or the like and more specifically a lithium secondary battery.

The lithium secondary battery specifically includes a positive electrode, a negative electrode disposed to face the positive electrode, a separator interposed between the positive electrode and the negative electrode, and an electrolyte. The positive electrode has been described above. In addition, the lithium secondary battery may optionally further include: a battery container which accommodates an electrode assembly including the positive electrode, the negative electrode, and the separator; and a sealing member which seals the battery container.

In the lithium secondary battery, the negative electrode includes a negative electrode current collector and a negative electrode active material layer formed on the negative electrode current collector.

The negative electrode current collector is not particularly limited as long as it does not cause a chemical change in the battery and has high conductivity. For example, copper, stainless steel, aluminum, nickel, titanium, calcined carbon, copper or stainless steel whose surface has been treated with carbon, nickel, titanium, silver, or the like, an aluminum-cadmium alloy, or the like may be used as the negative electrode current collector. In addition, the negative electrode current collector may typically have a thickness of 3 μm to 500 μm and have fine irregularities formed on the surface thereof to increase the adhesion of a negative electrode active material like the positive electrode current collector. Additionally, the negative electrode current collector may be used in any of various forms such as a film, a sheet, a foil, a net, a porous material, a foam, a non-woven fabric, and the like.

The negative electrode active material layer includes a negative electrode active material and, optionally, a binder and a conductive material. For example, the negative electrode active material layer may be formed by applying, onto a negative electrode current collector, a composition for forming a negative electrode, which includes a negative electrode active material and, optionally, a binder and a conductive material, and then drying the same, or by laminating, on a negative electrode current collector, a film obtained by casting the composition for forming a negative electrode on a separate support and removing it from the support.

As the negative electrode active material, a compound that enables the reversible intercalation and deintercalation of lithium may be used. Specific examples of the negative electrode active material include: a carbonaceous material such as artificial graphite, natural graphite, graphitized carbon fiber, amorphous carbon, or the like; a metallic compound capable of alloying with lithium, such as Si, Al, Sn, Pb, Zn, Bi, In, Mg, Ga, Cd, a Si alloy, a Sn alloy, an Al alloy, or the like; a metal oxide capable of doping and dedoping lithium, such as $SiO_\beta$ ($0<\beta<2$), $SnO_2$, vanadium oxide, or lithium vanadium oxide; and a composite including the metallic compound and the carbonaceous material, such as a Si—C composite or a Sn—C composite, which may be used alone or in combination of two or more thereof. In addition, a lithium metal thin film may be used as the negative electrode active material. Additionally, as a carbon material, both low-crystallinity carbon and high-crystallinity carbon may be used. Representative examples of the low-crystallinity carbon include soft carbon and hard carbon, and representative examples of the high-crystallinity carbon include amorphous, platy, flaky, spherical or fibrous natural graphite or artificial graphite, Kish graphite, pyrolytic carbon, mesophase pitch-based carbon fiber, meso-carbon microbeads, mesophase pitches, and high-temperature calcined carbon such as petroleum or coal tar pitch-derived cokes, and the like.

In addition, the binder and the conductive material are the same as those described in the positive electrode.

Meanwhile, in the lithium secondary battery, the separator serves to separate the negative electrode and the positive electrode and provide a passage for lithium ion migration. As the separator, any separator that is typically used in a lithium secondary battery may be used without particular limitation, and in particular, a separator that exhibits low resistance to the migration of electrolyte ions and has an excellent electrolyte impregnation ability is preferred. Specifically, a porous polymer film, for example, a porous polymer film made of a polyolefin-based polymer such as an ethylene homopolymer, a propylene homopolymer, an ethylene/butene copolymer, an ethylene/hexene copolymer, an ethylene/methacrylate copolymer, or the like or a stacked structure having two or more layers thereof, may be used. In addition, a typical porous non-woven fabric, for example, a non-woven fabric made of high-melting-point glass fiber, polyethylene terephthalate fiber, or the like may be used. Also, to ensure heat resistance or mechanical strength, a coated separator which includes a ceramic component or polymer material and is optionally in a single-layer or multi-layer structure may be used.

In addition, as the electrolyte used in the present invention, an organic liquid electrolyte, an inorganic liquid electrolyte, a solid polymer electrolyte, a gel-type polymer electrolyte, an inorganic solid electrolyte, a molten-type inorganic electrolyte, or the like, which is usable in the manufacture of the lithium secondary battery, may be used, but the present invention is not limited thereto.

Specifically, the electrolyte may include an organic solvent and a lithium salt.

As the organic solvent, any solvent that may function as a medium through which ions involved in an electrochemical reaction of the battery can migrate may be used without particular limitation. Specifically, the organic solvent may be: an ester-based solvent such as methyl acetate, ethyl acetate, γ-butyrolactone, ε-caprolactone, or the like; an ether-based solvent such as dibutyl ether, tetrahydrofuran, or the like; a ketone-based solvent such as cyclohexanone or the like; an aromatic hydrocarbon-based solvent such as benzene, fluorobenzene, or the like; a carbonate-based solvent such as dimethyl carbonate (DMC), diethyl carbonate (DEC), methyl ethyl carbonate (MEC), ethyl methyl carbonate (EMC), ethylene carbonate (EC), propylene carbonate (PC), or the like; an alcohol-based solvent such as ethyl alcohol, isopropyl alcohol, or the like; a nitrile such as R—CN (R is a C2-C20 hydrocarbon group with a linear, branched or cyclic structure and may include a double-bonded aromatic ring or an ether linkage) or the like; an amide such as dimethylformamide or the like; dioxolane such as 1,3-dioxolane or the like; or sulfolane. Among those listed above, the carbonate-based solvent is preferred, and a mixture of a cyclic carbonate-based compound with high ion conductivity and high permittivity (e.g., EC, PC, etc.) and a linear carbonate-based compound with low viscosity (e.g., EMC, DMC, DEC, etc.), which may increase the charging/discharging performance of the battery, is more preferred. In this case, when a mixture obtained by mixing the cyclic carbonate-based compound and the linear carbonate-based compound in a volume ratio of about 1:1 to about 1:9 is used, excellent electrolyte performance may be exhibited.

As the lithium salt, any compound that may provide lithium ions used in a lithium secondary battery may be used without particular limitation. Specifically, as the lithium salt, $LiPF_6$, $LiClO_4$, $LiAsF_6$, $LiBF_4$, $LiSbF_6$, $LiAlO_4$, $LiAlCl_4$, $LiCF_3SO_3$, $LiC_4F_9SO_3$, $LiN(C_2F_5SO_3)_2$, $LiN(C_2F_5SO_2)_2$, $LiN(CF_3SO_2)_2$, LiCl, LiI, $LiB(C_2O_4)_2$, or the like may be used. The lithium salt is preferably used at a concentration of 0.1 to 2.0 M. When the concentration of the lithium salt is within the above-described range, the electrolyte has appropriate levels of conductivity and viscosity, and thus excellent electrolyte performance can be exhibited, and lithium ions can effectively migrate.

In addition to the above-described electrolyte components, the electrolyte may further include at least one additive selected from a haloalkylene carbonate-based compound such as difluoroethylene carbonate and the like, pyridine, triethylphosphite, triethanolamine, cyclic ether, ethylenediamine, n-glyme, hexamethylphosphoric triamide, a nitrobenzene derivative, sulfur, a quinone imine dye, an N-substituted oxazolidinone, an N,N-substituted imidazolidine, an ethylene glycol dialkyl ether, an ammonium salt, pyrrole, 2-methoxyethanol, aluminum trichloride, and the like for the purpose of improving the lifetime characteristics of the battery, suppressing a reduction in battery capacity, improving the discharge capacity of the battery, or the like. In this case, the additive may be included at 0.1 to 5 wt % with respect to the total weight of the electrolyte.

Since the lithium secondary battery including the positive electrode active material according to the present invention stably exhibits excellent discharge capacity, output characteristics, and capacity retention rate as described above, it is useful in the field of portable devices such as mobile phones, notebook computers, digital cameras, and the like and electric vehicles such as hybrid electric vehicles (HEVs) and the like.

Accordingly, yet another aspect of the present invention provides a battery module including the lithium secondary battery as a unit cell and a battery pack including the battery module.

The battery module or battery pack may be used as a power source for one or more medium-to-large-sized devices selected from a power tool; electric vehicles (EVs), hybrid electric vehicles, and plug-in hybrid electric vehicles (PHEVs); and a system for storing electric power.

Hereinafter, the present invention will be described in detail with reference to embodiments so that those skilled in the art can easily carry out the present invention. However, the present invention may be embodied in several different forms, and therefore, is not limited to embodiments described herein.

Example 1

LiOH as a lithium source was added to $Ni_{0.8}Co_{0.1}Mn_{0.1}(OH)_2$ as a positive electrode active material precursor so that a Li/metal (Ni, Co, and Mn) molar ratio was 1.05, and 2 parts by weight of LiOH as a first firing additive, 1 part by weight of $MgCO_3$ as a second firing additive, and 2 parts by weight of $B_2O_3$ as a third firing additive were added thereto so that the total content of firing additives was 5 parts by weight with respect to 100 parts by weight of the positive electrode active material precursor and then mixed. For thermal treatment, the mixed powder was input into an alumina crucible. Afterward, firing was performed at 800° C. under an oxygen atmosphere for 20 hours to prepare a lithium transition metal oxide. Subsequently, the lithium transition metal oxide was pulverized, rinsed, and dried to obtain powder, and the obtained powder was thermally treated at 700° C. under an air atmosphere to obtain a positive electrode active material in the form of a single particle.

Example 2

A positive electrode active material was prepared in the same manner as in Example 1 except that 2 parts by weight of LiF as a first firing additive, 1 part by weight of $CaCO_3$ as a second firing additive, and 2 parts by weight of $H_3BO_3$ as a third firing additive were added so that the total content of firing additives was 5 parts by weight with respect to 100 parts by weight of a positive electrode active material precursor.

Example 3

A positive electrode active material was prepared in the same manner as in Example 1 except that 3 parts by weight of LiOH as a first firing additive, 1 part by weight of $MgCO_3$ as a second firing additive, and 1 part by weight of $B_2O_3$ as a third firing additive were added so that the total content of firing additives was 5 parts by weight with respect to 100 parts by weight of a positive electrode active material precursor.

Comparative Example 1

A positive electrode active material was prepared in the same manner as in Example 1 except that only LiOH (first firing additive) was added as a firing additive in an amount of 5 parts by weight with respect to 100 parts by weight of a positive electrode active material precursor (second and third firing additives were not added).

Comparative Example 2

A positive electrode active material was prepared in the same manner as in Example 1 except that only $MgCO_3$ (second firing additive) was added as a firing additive in an amount of 5 parts by weight with respect to 100 parts by weight of a positive electrode active material precursor (first and third firing additives were not added).

Comparative Example 3

A positive electrode active material was prepared in the same manner as in Example 1 except that only $B_2O_3$ (third firing additive) was added as a firing additive in an amount of 5 parts by weight with respect to 100 parts by weight of a positive electrode active material precursor (first and second firing additives were not added).

Comparative Example 4

A positive electrode active material was prepared in the same manner as in Example 1 except that LiOH (first firing additive) and $B_2O_3$ (third firing additive) were added as firing additives each in an amount of 2.5 parts by weight with respect to 100 parts by weight of a positive electrode active material precursor (a second firing additive was not added).

Comparative Example 5

A positive electrode active material was prepared in the same manner as in Example 1 except that first, second, and third firing additives were not added, and firing was performed at 900° C. under an oxygen atmosphere for 20 hours to prepare a lithium transition metal oxide.

Experimental Example 1: Observation of Positive Electrode Active Material

The positive electrode active materials prepared in Examples 1 to 3 and Comparative Examples 1 to 5 were observed while being enlarged using a scanning electron microscope (SEM), and enlarged SEM images thereof are shown in FIGS. 1 to 8.

Referring to FIGS. 1 to 3, it can be seen that the positive electrode active materials prepared in Examples 1 to 3 of the present invention were formed with a primary particle structure in the form of a single particle. On the other hand, referring to FIGS. 4 to 7, it can be seen that the positive electrode active materials prepared in Comparative Examples 1 to 4 were formed in the form of a secondary particle formed by agglomerating primary particles. Although the positive electrode active materials of Examples 1 to 3 and Comparative Examples 1 to 4 were prepared under the same firing temperature and time conditions, the positive electrode active materials of Comparative Examples 1 to 4 were prepared in the form of a secondary particle, and the positive electrode active materials of Example 1 to 3, in which a specific combination of firing additives of the present invention was used, were prepared in the form of a single particle. In the case of Comparative Example 5, since the positive electrode active material was prepared at a high firing temperature of 900° C., it was formed in the form of a single particle but exhibited substantially degraded resistance characteristics as shown in Experimental Example 4 below.

Experimental Example 2: Measurement of Gas Generation Upon High-Temperature Storage Each of the positive electrode active materials prepared in Examples 1 to 3 and Comparative Examples 1 to 4, carbon black as a conductive material, and PVDF as a binder were mixed in a weight ratio of 96:2:2 in an N-methyl pyrrolidone solvent to prepare a positive electrode mixture (viscosity: 5,000 mPa-s), and the positive electrode mixture was applied onto one surface of an aluminum current collector, dried at 130° C., and roll-pressed to manufacture a positive electrode.

As a negative electrode, lithium metal was used.

A porous polyethylene separator was interposed between the manufactured positive electrode and the negative electrode to manufacture an electrode assembly. Then, the electrode assembly was located in a case, and an electrolyte solution was injected into the case to manufacture a lithium secondary battery. In this case, the electrolyte solution was prepared by dissolving 1.0 M lithium hexafluorophosphate (LiPF$_6$) in an organic solvent containing ethylene carbonate, ethyl methyl carbonate, and diethyl carbonate (EC/EMC/DEC volumetric mixing ratio=3/4/3).

Each manufactured lithium secondary battery (half cell) was charged in the CC/CV mode of 0.2 C until 4.25 V was reached (final current: 1/20 C). After the charging, the cells were disassembled to obtain two charged positive electrodes and two polyethylene separators, the obtained positive electrodes and polyethylene separators were alternately stacked on a lower plate of a coin cell, and an electrolyte solution was injected, thereby assembling a coin cell again. Afterward, the resulting cell was stored at 70° C. for 2 weeks, and generated gas was measured through gas chromatography-mass spectrometry (GC-MS). Results thereof are shown in the following Table 1.

TABLE 1

|  | Gas generation amount upon high-temperature storage (μl/g) |
| --- | --- |
| Example 1 | 1806 |
| Example 2 | 2101 |
| Example 3 | 1786 |
| Comparative Example 1 | 3505 |
| Comparative Example 2 | 3787 |
| Comparative Example 3 | 3022 |
| Comparative Example 4 | 2916 |

Referring to Table 1, it can be seen that Examples 1 to 3 using the positive electrode active materials in the form of a single particle exhibited substantially low gas generation amounts upon high-temperature storage compared to Comparative Examples 1 to 4 using the positive electrode active materials in the form of a secondary particle.

Experimental Example 3: Lifetime Characteristics

A lithium secondary battery (full cell) was manufactured using each of the positive electrode active materials prepared in Examples 1 to 3 and Comparative Examples 1 to 5. The lithium secondary battery (full cell) was manufactured in the same manner as in Experimental Example 2 except that a negative electrode was manufactured by mixing graphite as a negative electrode active material, carbon black as a conductive material, and PVDF as a binder in a weight ratio of 96:2:2 in an N-methyl pyrrolidone solvent to prepare a negative electrode mixture, applying the negative electrode mixture onto one surface of a copper current collector, followed by drying at 130° C. and roll pressing.

The manufactured lithium secondary battery (full cell) was charged at 45° C. in the CC/CV mode of 0.2 C until 4.2 V was reached, and discharged in the CC mode of 0.2 C. Afterward, the cell was charged at 45° C. in the CC/CV mode of 0.7 C until 4.2 V was reached, and discharged at a constant current of 0.5 C until 3 V was reached, and a capacity retention rate when 300 cycles of the charging and discharging had proceeded was measured. Results thereof are shown in the following Table 2.

TABLE 2

|  | Capacity retention rate (%) (@ 300$^{th}$ cycle) |
| --- | --- |
| Example 1 | 85.6 |
| Example 2 | 83.4 |
| Example 3 | 85.1 |
| Comparative Example 1 | 60.2 |
| Comparative Example 2 | 69.3 |
| Comparative Example 3 | 72.1 |
| Comparative Example 4 | 76.1 |
| Comparative Example 5 | 82.6 |

Referring to Table 2, it can be seen that Examples 1 to 3 using the positive electrode active materials in the form of a single particle exhibited substantially improved lifetime characteristics compared to Comparative Examples 1 to 4 using the positive electrode active materials in the form of a secondary particle. In addition, it can be seen that Examples 1 to 3 exhibited improved lifetime characteristics compared to Comparative Example 5 in which firing was performed at a high temperature without any firing additives.

Experimental Example 4: Resistance Measurement Result

The lithium secondary battery (coin-type half-cell) manufactured using each of the positive electrode active materials prepared in Example 1 and Comparative Example 5 as in Experimental Example 2 was discharged at 10% SoC and 1 C, and resistance at room temperature for 10 seconds was measured. Results thereof are shown in the following Table 3.

TABLE 3

|  | Resistance (Ohm) (@ SoC 10) |
| --- | --- |
| Example 1 | 26.7 |
| Comparative Example 5 | 32.5 |

Referring to Table 3, it can be seen that Comparative Example 5, in which firing was performed at a high temperature without any firing additives, exhibited substantially high resistance compared to Example 1.

The invention claimed is:

1. A method of preparing a positive electrode active material for a secondary battery, the method comprising:
    mixing a positive electrode active material precursor, a lithium source material, a first firing additive, a second firing additive, and a third firing additive to form a mixture, wherein the positive electrode active material precursor contains nickel, cobalt, and manganese and has a nickel content of 60 mol % or more relative to a total molar amount of metals in the positive electrode active material precursor;
    performing primary firing of the mixture at a temperature of 650° C. to 850° C. to form a lithium transition metal oxide; and
    pulverizing and rinsing the lithium transition metal oxide, and then performing secondary firing at a temperature of 600° C. to 750° C.,
    wherein the first firing additive is a lithium-containing compound,
    the second firing additive is a carbonate ion-containing compound, and
    the third firing additive is a boron-containing compound,
    wherein the lithium transition metal oxide is in the form of a single particle consisting of a primary particle, and
    wherein the single particle has an average particle diameter ($D_{50}$) ranging from 1-8 microns.

2. The method of claim 1, wherein the first firing additive is at least one selected from the group consisting of LiOH, $Li_2CO_3$, $Li_2O$, and LiF.

3. The method of claim 1, wherein the second firing additive is at least one selected from the group consisting of $BaCO_3$, $NaCO_3$, $MgCO_3$, and $CaCO_3$.

4. The method of claim 1, wherein the third firing additive is at least one selected from the group consisting of $B_2O_3$ and $H_3BO_3$.

5. The method of claim 1, wherein the first firing additive, the second firing additive, and the third firing additive are present in an amount of 30 parts by weight to 60 parts by weight, 10 parts by weight to 40 parts by weight, and 10 parts by weight to 40 parts by weight, respectively, with respect to 100 parts by weight of the first, second, and third firing additives.

6. The method of claim 1, wherein a total content of the first, second, and third firing additives is in a range of 0.5 parts by weight to 15 parts by weight with respect to 100 parts by weight of the positive electrode active material precursor.

7. The method of claim 1, wherein the positive electrode active material precursor has a nickel content of 80 mol % or more relative to a total molar amount of metals in the positive electrode active material precursor.

* * * * *